United States Patent [19]
Bardet

[11] 4,039,311

[45] Aug. 2, 1977

[54] AUTOMATIC CONTINUOUS PROCESS MACHINE FOR THE MANUFACTURE OF GLASS OBJECTS

[75] Inventor: Gérard Bardet, Paris, France

[73] Assignee: Automatisme et Technique, Arcueil, France

[21] Appl. No.: 699,307

[22] Filed: June 24, 1976

[30] Foreign Application Priority Data

June 26, 1975   France ............................. 75.20172

[51] Int. Cl.² ............................................. C03B 9/40
[52] U.S. Cl. ..................................... 65/163; 65/241; 65/235
[58] Field of Search ......................... 65/235, 241, 163

[56] References Cited

U.S. PATENT DOCUMENTS 1,904,959   4/1933   Soubier .............................. 65/241 X Primary Examiner—Arthur D. Kellogg
Attorney, Agent, or Firm—Kinzer, Plyer, Dorn & McEachran

[57] ABSTRACT

The invention consists an automatic continuous process (kinematic) machine for the manufacture of glass objects characterized in that it comprises, between the blanking drum and the finishing drum, a sliding beam whose sliding motion enables the time period between the vehicles leaving the blanking drum and their entry into the finishing drum to be regulated instantly and precisely while the machine is in operation.

4 Claims, 10 Drawing Figures

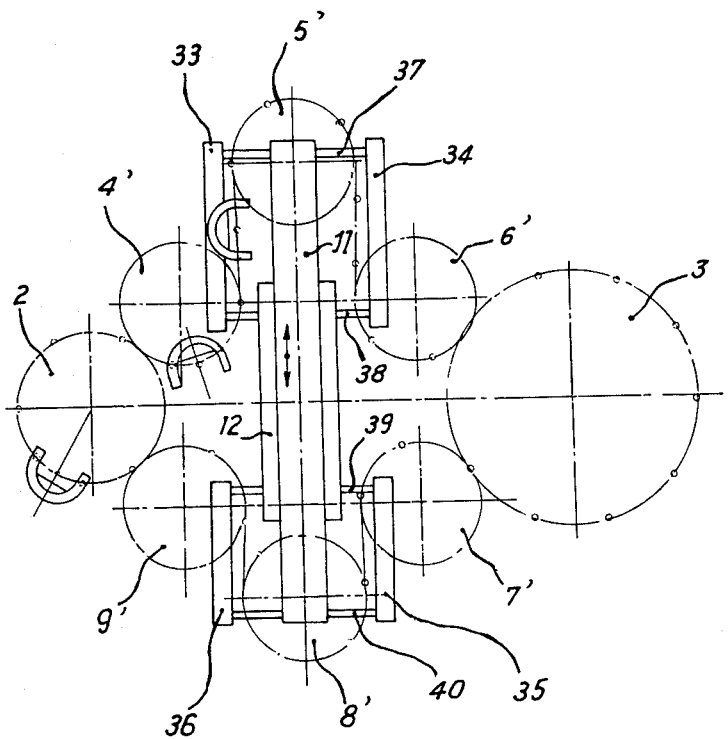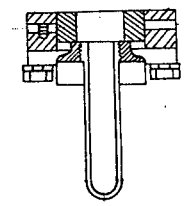
FIG. 2                    FIG. 2a

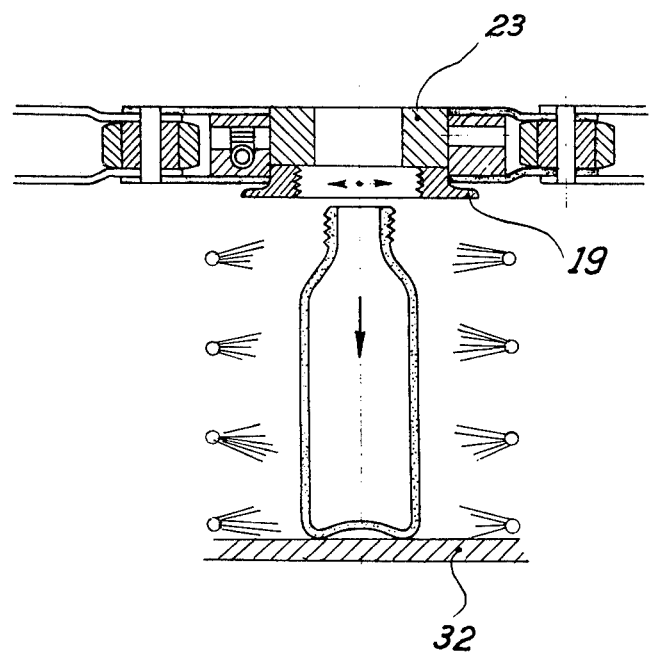
- FIG. 6 -

AUTOMATIC CONTINUOUS PROCESS MACHINE FOR THE MANUFACTURE OF GLASS OBJECTS

The invention relates to an automatic continuous process (kinematic) machine for the manufacture of glass objects, and in particular for the manufacture of flasks and bottles.

The manufacture of flasks and bottles and other glass objects comprises two basic phases: a first phase, in which a "blank" is made, and a second phase, in which this blank is transformed into the finished product.

The production of the blank is made in a mold consisting of three parts that open: a mold body, a mold base and, opposite the mold base, a "ring mold". Whereas the body and the base of the mold serve to form the actual body of the blank, which subsequently, in the finishing phase becomes the body of the flask or bottle, the ring mold serves to shape the part which subsequently will become, during the finishing phase, the neck of the bottle.

The blank mold thus constituted is fed with a "ball" of glass, and the glass constituting this ball is then applied to the walls of the mold, either with a blanking plunger or by the introduction of a compressed air blast.

In the first case, when a blanking plunger is used, the blank is said to be "pressed", and in the second case, when compressed air is used, the blank is said to have been "blown".

After the operation which has resulted in the blank being pressed or blown, the blank is transferred into a finishing mold, also consisting of three parts that open, namely: a body, a base and a ring mold (this latter, moreover, generally being the same as the blank mold), and compressed air is then blown into the interior of the blank so that the glass of the blank is applied to the walls of the finishing mold, thus giving the flask or the bottle its final shape. The finishing mold is then opened and the flask or bottle is transferred into an annealing installation.

In the succession of operations which have just been described it is essential in order to maintain the temperature of the glass at a uniformly even temperature, that the time interval between the blanking operation and the finishing operation should be capable of being regulated precisely. Such regulation varies in accordance with the dimensions and the shape of the products that are manufactured as well as the characteristics of the glass that is used.

Automatic machines are already known and in particular automatic continuous process (kinematic) machines for the manufacture of flasks and bottles.

One of these known machines comprises a single drum with a vertical axis, the upper part of this drum being used for blanking and the lower part for finishing. In this machine, the ring molds are common to the blanking molds and the finishing molds. On completion of the blanking operation and opening of the base and body of the blanking mold, the ring mold remains closed, thus holding the blank, and then pivoting about a horizontal axis to tip the blank into the finishing mold placed below, in an open position.

Machines of the type, with only one drum, have a number of disadvantages. In particular, because the two operations, of unequal duration, are necessarily separated by a time interval represented by the temperature equalization period, succeed each other on the same drum, of which each station is entirely equipped with a blanking mold, a fininshing mold, a device of feeding glass etc., the utilization rate of each of the specialized equipment is generally far from its optimum value. This makes it necessary to increase the amount of equipment and results, for a given production amount, in a size and cost of machine which is very much greater than that which would be involved if it were possible to fully utilize the various equipment.

In order to attempt to overcome these disadvantages machines have been constructed comprising at least two drums, one of the drums being used for the blanking operation, and the other for the finishing operation, while additional drums can be provided for ancillary operations such as intermediate shaping preceding the finishing shaping.

According to the conventional methods in continuous process machines, these different operational drums can be connected to one another by transfer means such as transfer drums, transfer conveyors, chains or belts etc. These transfer means enable the products to move between the drums, which products can generally be held in vehicles, constituted preferably here by ring molds.

Such continuous process machines with several drums, connected to one another by transfer means, enable the utilization rate of the various specialized equipment to be increased considerably and enable, in consequence to reduce, for a given production rate, both the size and the cost of the required construction.

However, these machines, like the other known machines, do not enable the period during which the temperature is rendered uniform between the blanking and finishing operations to be regulated instantly and precisely. In addition, these machines, just like the machines of the type previously mentioned, in general make it difficult to make blanks by means of blowing.

The object of the invention is to overcome the disadvantages of the machines known at present and to provide, in consequence an automatic continuous process (kinematic) machine for the manufacture of glass objects which, while permitting the optimal use of the various specialized equipment and therefore a reduction in costs and the size of the construction, also enables the temperature equalization period between the blanking and finishing operations to be regulated precisely and instantaneously. In addition, this machine can be adapted very easily for manufacture by blowing, as well as by pressing. Finally, this machine should enable the finished products to be collected from the openings of a drum, in particular for facilitating their conditioning for the utilization of new annealing techniques.

To this end the invention relates to an automatic continuous process (kinematic) machine for the manufacture of glass objects, and in particular for the manufacture of flasks and bottles, which machine comprises at least two operational drums, of which one is designed to make the blank and the other to finish the bottle, other operational drums being if necessary interposed between the preceding operations for intermediate shaping operations; the products, such as bottles or flasks, placed inside vehicles, being transferred between the drums, either directly or by intermediate transfer means, such as chains or conveyors, which machine is characterized in that it comprises, between the blanking drum and the finishing drum, a sliding beam, whose sliding movement enables the time period between the vehicles leaving the blanking drum and their entry into the finishing drum to be regulated instantly and precisely while the machine is in operation, the transmission unit driving the various drums comprises means of compensating the angular shifts of certain drums resulting from the sliding movement of the beam.

The invention will now be described in greater detail referring to examples of its embodiment shown schematically on the accompanying drawings in which:

FIG. 2 is a schematic plan view of a variant of the machine according to the invention;

FIG. 2a is a vertical section of a vehicle of the machine according to FIG. 2;

Figure 4A:
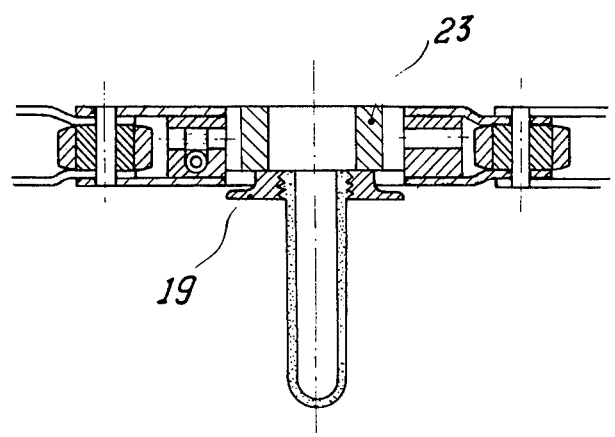
Figure 4B:
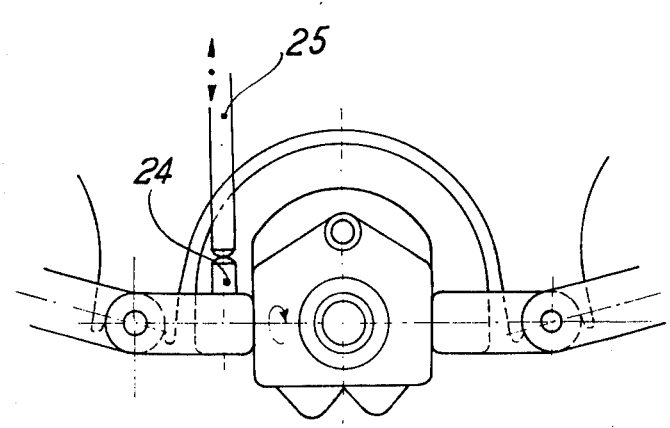
Figure 5A:
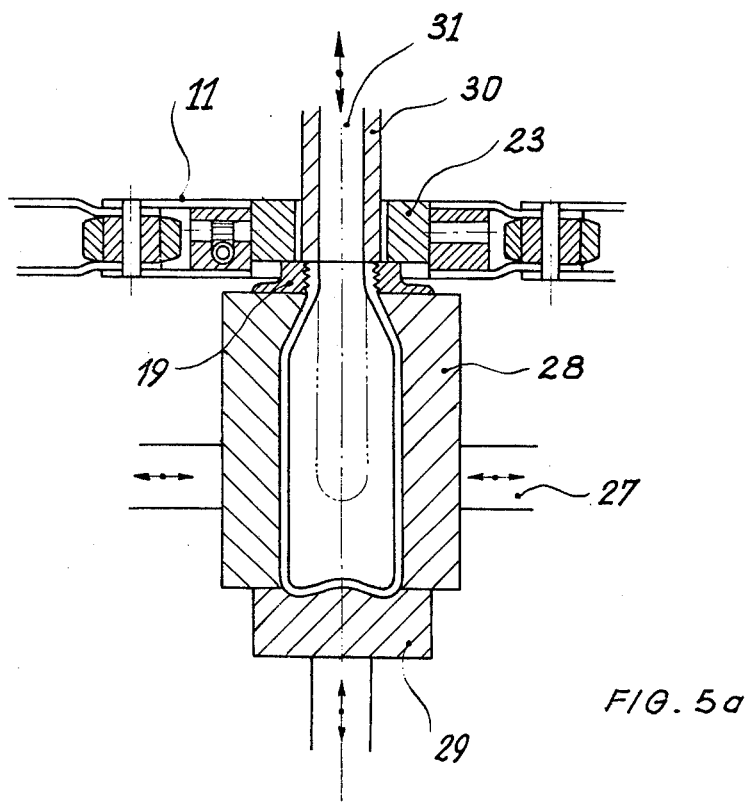
Figure 5B:
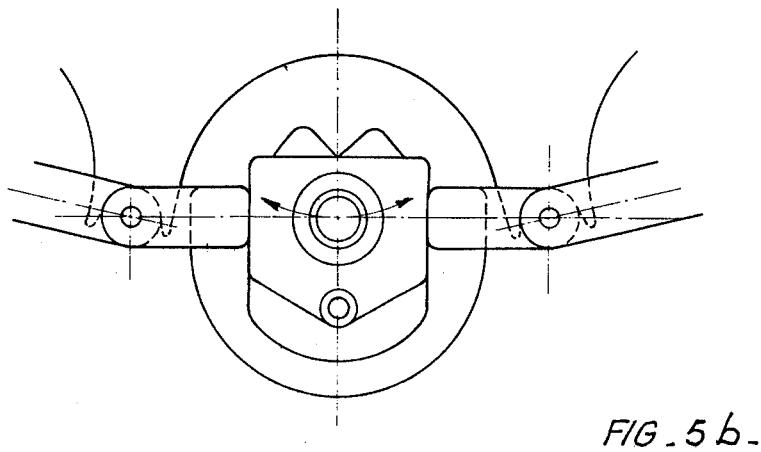

FIGS. 4a and 4b schematically represent respectively in vertical section and as a plan view, a transfer drum station following the blanking drum;

FIGS. 5a and 5b represent schematically, respectively in vertical section and as a plan view, the finishing drum station;

FIG. 6 repesents schematically, in vertical section, a transfer drum station following the finishing drum.

Figure 1:
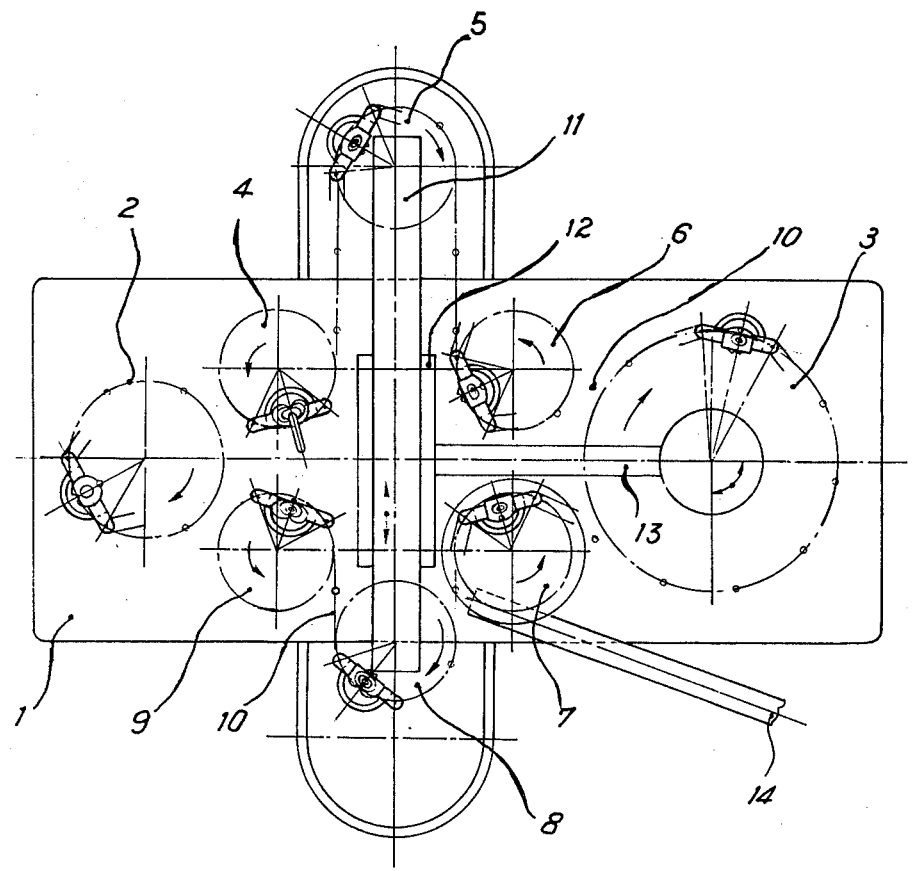
FIG. 1 is a schematic plan view of the machine according to the invention.

The automatic continuous process machine for the manufacture of flasks and bottles or other glass objects, shown schematically in FIG. 1, comprises essentially, on a frame 1 two operational drums 2 and 3, the drum 2 being used for blanking and the drum 3 for finishing. It is in order not to complicate unnecessarily FIG. 1, intended solely to demonstrate the principle of the machine that the number of operational drums is being limited to two, but it is of course understood that their number could be greater and that for example one or several operational drums for the intermediate shaping of the flask or bottle could be inserted between the drums 2 and 3.

The machine also includes six transfer drums 4, 5, 6, 7, 8 and 9. All these drums are connected to one another in the known manner by a transport means in the form of a chain 10 carrying vehicles (carriers), which vehicles are in this case ring molds for serving for the transfer or transport of the glass object drum between two consecutive drums.

Between, on one hand the operational drum 2 and the transfer drums 4 and 9 associated with it and, on the other hand, the operation of drum 3 and the two transfer drums 6 and 7 which are associated with it, is a beam 11, carrying at its two extremities respectively the transfer drums 5 and 8 and able to slide in the guide 12. Reference 13 designates a transmission device enabling the angular shift (phase angle) of the drum 3 to be varied in accordance with the position of the beam 11 in the slide unit 12. Finally reference 14 designates a device for discharging the finished bottles.

The operation of the machine will now be described with reference to FIGS. 3 to 6.

Figure 3A:
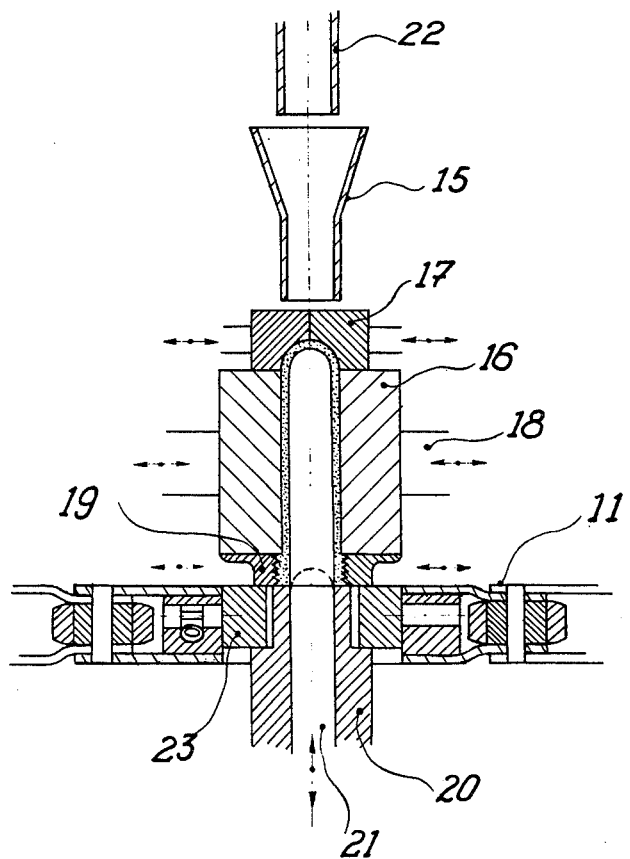
FIGS. 3a and 3b represent schematically, respectively a vertical section and a plan view of a blanking drum station.
Figure 3B:
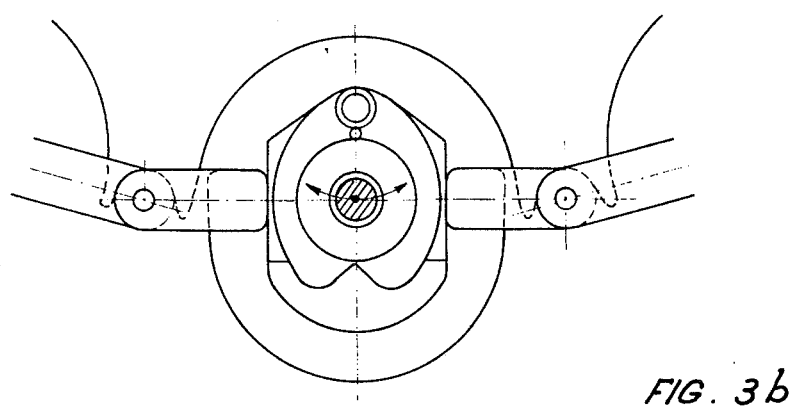

The FIGS. 3 and 3b show respectively, a vertical section and a plan view of a blanking drum station. This station comprises successively from top to bottom:

a spout 15 for receiving the glass ball, driven rotatively with the drum, a blanking mold designated globally by 16 and consisting of three parts, namely, a base 17, a body 18 and a ring mold 19. The parts 17, 18 and 19 of the mold 16 can open or close in their plane parallel to that of FIG. 3a, as the different arrows show. The base 17 and the body 18 of the blanking mold 16 are integral with the blanking drum and are driven rotatively with it. On the other hand, the ring mold 19 is integral with the chain 10 and follows the course of this chain which coincides only partially with the periphery of the blanking drum 2. A closure piston 20, driven rotatively by the blanking drum 2, is able to move vertically, closes the lower part of the ring mold 19. In this closure piston 20 is guided a blanking plunger 21, which can penetrate the interior of the blanking mold and is represented in FIG. 3a by a continuous line in its highest position.

The unit which has just been described operates in the following manner: the drum 2 revolves in the uniform movement about its vertical axis and is accompanied in its rotation by the chain 10. From a feed spout 22, which is fixed with respect to the frame of the machine, falls a glass ball distributed by known means such as feeder shears. This glass ball is connected collected in flight by the receiving spout 15 and, as the base 17 of the mold 16 is open, the ball falls onto the head of the piston 21, which is then in the low position represented by the local lines in FIG. 3a. As the drum continues rotating, the base 17 of the mold closes and the piston 21 rises to its maximum height, thus pushing back the glass against the wall of the blanking mold and giving the blanking shape. Then, the plunger 21 comes back to its low position inside the closing piston 20; the piston descends to disengage from the chain 10 and, on the other hand, the base 17 and the body 18 of the mold 16 open in order to enable the chain 10, by means of the ring mold 19 to carry the blank outside the drum onto the transfer drum 4.

During its course on the periphery of the transfer drum 4, the support 23 of the ring mold 19 turns through 180° about the horizontal axis by the action of the pusher 24, actuated by a pushing rod 25 forming part of the transfer drum 4 (FIGS. 4a and 4b). The effects of this rotation is to turn over the blank whose opening from now onward is directed upward.

Still driven by the chain 10, the ring mold 19 carrying the blank passes onto the transfer drums 5 and 6 and engages on the finishing operational drum 3. On arrival on drum 3, the blank engages between the two parts separated from one another of the body 28 of the finishing mold designated globally by 27. The parts of the body 28 then unite to enclose the blank, while the base 29 is applied to the lower part of the body 28. A tubular closing and blowing piston 30 then engages in the link of the chain 10 to close the upper part of the ring mold 19, while leaving free an axial channel 31 through which the compressed air is blown to apply the glass of the blank onto the walls of the finishing mold 27, thus giving the flask or bottle their final shape (FIGS. 5a and 5b).

As the drum 3 continues to rotate, the piston 30 arises again, the base 29 descends and the two parts of the body 28 of the mold 27 move away from one another so as to enable the bottle, remaining suspended by its neck to the ring mold 19 to be carried by the chain 10 on the exterior of the drum 3 onto the transfer drum 7.

During the course of the bottle on the transfer drums 7, the ring mold 19 opens, liberating the bottle which falls from a low height onto a receiving tray 32 (FIG. 6). In fact, the tray 32 can form the base of the drum with openings (not represented), so that the bottle liberated by the ring mold 19 will be positioned exactly on a drum, which can facilitate its transfer onto other drums, with a view in particular to treatment by new annealing techniques.

It can also be envisaged that the bottle resting on the tray 32 be discharged from this tray by means of a ramp, onto a conveyor belt 14, as shown in FIG. 1.

After the bottle has been ejected, the link of the chain 10 which carried this bottle by means of the intermediate transfer drum 8 reaches the transfer drum 9, where the central part of this link, forming the support 23 of the ring mold 19, pivots again through 180° in a manner exactly analogous to that in which it had pivoted on the drum 4, so that the ring mold is again on the upper part of this link and that the cycle of operations which has just been described can repeat itself.

As has been emphasized above, it is extremely important that the time interval between blanking and finishing, that is to say, between the movement when the blank emerges from the operational drum 2 and the moment when it reaches the operational drum 3, be capable of being regulated instantly and precisely. Such regulation is obtained by the sliding movement of the beam 11 in its guide 12 (FIG. 1) which allows, without varying the total length of the chain 10 or the speed of this chain, to modify the length of the part of the chain 10 which is between the drums 2 and 3, and consequently, to modify the time interval between the emergence of the bottle from the drum 2 to its entry into the drum 3.

However, this variation in the length of the part of the chain 10 between the drums 2 and 3 has the consequence of modifying the angular adjustment of the drum 3 with respect to the drum 2 taken as reference. As the chain 10 constitutes only a means of transferring vehicles and not as a means of driving the drums, which in fact is assured by a transmission assembly common to the whole of the machine, it is indispensible that inside this transmission assembly, the drum 3 be reset (rephased) and, if necessary also the transfer drums 5, 6, 7 and 8, in accordance with the position of the beam 11. Although the very existence of this angular resetting means is one of the characteristics of the invention, the mode of making this resetting means can be imagined in various ways by making use of conventional means such as differential gears and this consequence is not a part of the claims for this invention.

It is for this reason, on FIG. 1, that the resetting means have been shown schematically under reference 13 without entering into any detail.

FIG. 2 shows a variant of the embodiment of the machine according to the invention. In this variant, the operational drums 2 and 3 are seen again and also the six transfer drums 4',5',6', 7', 8' and 9', but, on the other hand, these drums are no longer connected to one another by a chain 10. The "vehicles" (FIG. 2a), carrying the ring mold are consequently no longer connected to one another by this chain 10 and are placed individually into the openings in the operational drum 2, from where they pass directly into the openings of the transfer drum 4', in the same way as in returning they pass directly from the openings of the transfer drum 9' into the openings of the operational drum 2. In the other part of the machine, the vehicles pass directly from the openings of the transfer drum 6' into the openings of the operational drum 3, and then pass directly into the openings of a transfer drum 7'.

In this second version of the machine, we also find again the beam 11 carrying at its extremities the transfer drums 5' and 8' and sliding in the slide unit 12. Between the transfer drum 4', on one hand, and the transfer drum 5', and then between the latter and the transfer drum 6', on the other hand, the passage or transport of the vehicles is obtained by means of the conveyors 33 and 34. These conveyors, for example, can be in the form of a moving band provided with catches for carrying the vehicles along, and the movement of which is synchronized with that of the transfer drums 4', 5' and 6'. Thus the vehicle is discharged from the transfer drum 4' onto the conveyor 33 and carried by the latter to the transfer drum 5' into which it is introduced, the same process repeating itself between the transfer drum 5' and the transfer drum 6' by means of the conveyor 34.

Similar arrangements are made with the aid of the synchronized conveyors 35 and 36, for moving the vehicles between, on one hand, the transfer drums 7' and 8' and, on the other hand, the transfer drums 8' and 9'. The length of the various conveyors 33, 34, 35 and 36 is adjustable, that is to say, that in the case of a transport band, the distances between the centers of their driving and return drums 37 and 38, on one hand, and 39 and 40, on the other, can be modified, this modification being made possible by the existence of a reverse of a length in the lower part of the conveyor, not used for the transfer of vehicles. In this manner it is possible to obtain the same effect in regulating the length of the course travelled by the vehicles between the operational drums 2 and 3 as in the case of a first variant according to FIG. 1. The angular adjustments of the transfer drums 5', 6', 7', 8', as well as the angular adjustment of the operational drum 3, must be modified in accordance with the position of the beam 11. This modification can be made by the interpositioning of differential organs analogous to those mentioned in connection with the variant according to FIG. 1, inside the transmission assembly of the machine controlling the various drums.

In practise, the method according to FIG. 1, using a transfer chain, is to be preferred in the case where the manufactured glass objects are small, and the method according to FIG. 2 is preferred in the case where the objects are large.

The two variants which have just been described meet the object of the invention satisfactorily. Thus, while retaining the advantages of continuous process machines with several operational drums, that is to say, in particular a very good utilization of the various specialized equipment, the two variants enable the time period between blanking and finishing to be regulated precisely and instantaneously, while in operation, in accordance, for example, with physical measurements made on the molds and the bottles during their manufacture. They also enable the machines to be adapted very simply, as desired, to making blanks by pressing or blowing. Finally they enable the products in the openings of a drum to be collected at the outlet of the machine, which provides a valuable facility for the rational feeding of installations such as annealing installations.

Of course, the invention is not limited to the examples of the embodiment herein above described, and on the basis of which other modes and forms of embodiment can be envisaged, without departing from the scope of the invention.

I claim:

1. A machine for the manufacture of glass objects comprising at least two operational rotary drums of which one is a blanking drum used to make a blank and the other is a finishing drum used to finish the product, and including transport means for transporting carriers for glass objects between the drums, characterized in that the machine comprises, between the blanking drum and the finishing drum, a sliding beam supporting at each end a transfer drum which is interposed in and constitutes part of the path of the transport means, whereby sliding the beam along its own axis in one direction or the other varies the length of the path between the blanking drum and the finishing drum.

2. A machine according to claim 1 further characterized by means to vary the phase angle of at least one of the operational drums to compensate for a variation in the position of the sliding beam.

3. A machine according to claim 1 in which the carrier is a mold supported for pivotal movement through 180° about a horizontal axis, and means to so pivot the mold that a blank formed on the blanking drum in the form of a bottle with its opening turned downward may be pivoted to arrive at the finishing drum with its opening turned upward, whereafter the mold may be pivoted through 180° in the opposite direction to assume its original position.

4. A machine according to claim 2 in which the carrier is a mold supported for pivotal movement through 180° about a horizontal axis, and means to so pivot the mold that a blank formed on the blanking drum in the form of a bottle with its opening turned downward may be pivoted to arrive at the finishing drum with its opening turned upward, whereafter the mold may be pivoted through 180° in the opposite direction to assume its original position.

* * * * *